United States Patent
Walter

(10) Patent No.: US 6,492,024 B1
(45) Date of Patent: Dec. 10, 2002

(54) PRECISION GRANULATION

(75) Inventor: Kim Torben Walter, Columbia, MD (US)

(73) Assignee: Aeromatic-Fielder AG, Bubendorf (CH)

( * ) Notice: Subject to any disclaimer, the term of this patent is extended or adjusted under 35 U.S.C. 154(b) by 110 days.

(21) Appl. No.: 09/604,968

(22) Filed: Jun. 28, 2000

Related U.S. Application Data

(60) Provisional application No. 60/140,987, filed on Jun. 29, 1999.

(51) Int. Cl.[7] ................................................. B32B 5/16
(52) U.S. Cl. ........................ 428/402; 23/293 A; 241/27; 427/212; 428/403
(58) Field of Search .......................... 427/212; 428/402, 428/403; 23/293 A; 241/27

(56) References Cited

U.S. PATENT DOCUMENTS

| | | | | |
|---|---|---|---|---|
| 3,639,170 A | * | 2/1972 | Hutton et al. ................. | 127/31 |
| 3,802,914 A | * | 4/1974 | Nezbed ........................ | 127/61 |
| 4,916,163 A | * | 4/1990 | Ni .............................. | 514/593 |
| 5,470,387 A | | 11/1995 | Liborius ..................... | 118/303 |
| 5,648,118 A | | 7/1997 | Liborius ..................... | 427/213 |
| 5,695,701 A | | 12/1997 | Funder et al. ............... | 264/117 |
| 5,718,764 A | | 2/1998 | Walter ........................ | 118/303 |
| 5,792,507 A | * | 8/1998 | Kato et al. .................. | 427/2.18 |
| 6,013,216 A | * | 1/2000 | Watanabe et al. ........... | 264/117 |
| 6,159,252 A | * | 12/2000 | Schutte et al. .......... | 23/313 FB |

* cited by examiner

*Primary Examiner*—H. Thi Le
(74) *Attorney, Agent, or Firm*—Sughrue Mion, PLLC

(57) ABSTRACT

In a granulation process only a small proportion of the material being treated is at any time subjected to a wetting and collision followed by a very fast drying whereby harmful increase of moisture content in the powder is avoided. By the process the particles to be granulated are sprayed with granulation liquid, brought into mutual contact, and dried while influenced by a fast swirling-upward gas stream in a vertical pipe. The fast drying prevents excessive penetration of coating liquid into the interior of the particles.

The low moisture content during the process involves operational advantages and allow for interruption and re-start of the operation at any time.

17 Claims, 4 Drawing Sheets

PRECISION GRANULATION

This is a Utility Application of Provisional Application No. 60/140,987 filed Jun. 29, 1999, the disclosure of which is incorporated herein by reference.

FIELD OF THE INVENTION

The invention relates to granulation,. i.e. transforming particles into granules each comprising several particles.

Granulation of fine powder materials is applied within various industries. Granulation is used to transform a powder with poor free flowing capability into a product with proper free flowing capabilities. Another reason for granulation is to avoid that the final product has an unwanted dust emission.

In the pharmaceutical industry granulation is used mainly for treating materials to be pressed into tablets.

In the food industries, incl. the dairy industry, granulation is used, inter alia to improve dispersibility and reconstitutional properties.

In the chemical industry granulation is used to improve the handling characteristics of the materials and the exactness of the dosage. Furthermore, granulation is used to bind active dust materials to harmless base substances.

Many chemical products, incl. detergents, fertilizers, catalysts, pesticides and dyestuffs, are wanted in a granulated form.

In the present specification, the term granulation is used including what is often termed agglomeration.

BACKGROUND OF THE INVENTION

In general, all granulation processes follow the same basic technique. The material to be granulated is wetted with a solvent or a solution to make the primary particles forming the material tacky A binder may be present in the particles or in the solution, or the ability of becoming tacky when wet may be inherent in the particles. The wet and tacky particles adhere to each other when brought into mutual contact and the junction is fixed by drying the material. Various materials differ in their ability to absorb the solvent or solution without getting totally wet and they become adhesive at different product humidity levels, so obviously not all materials are equally easy to granulate. To make the process more robust and easier to control, normally a combination of materials is used with different abilities to become tacky. Another approach to obtain adhesion between the particles is to use a mechanical force simultaneously with the wetting.

Granulation can be performed, using methods of different types.

One of these types is mechanical granulation. In mechanical granulation the solvent addition is low and the force, applied on the product, high. Mechanical granulations are classified in two main groups, high shear and low shear granulation. The advantage with high shear granulation is, that a broad range of formulations can be granulated. The granules produced in a high shear granulation are hard and compact, and the process is fast. One of the shortcomings of high shear granulation is the broad particle size distribution, which normally demands sizing by milling. The large sized compact granules (lumps) often found also give problems in the subsequent drying process.

Low shear granulation (such as ROTO-PROCESSOR™ from Aeromatic-Fielder) gives less compact granules and a more narrow particle size distribution. This type of granulation does not demand milling and the granules produced by it are easy to dry.

A disadvantage with the low shear granulation is the difficulty in scaling up and the limit in the size of the batch.

In both, high shear and low shear granulation, pure solvent or solvent combined with binder can be used.

Another type of conventional granulation is fluid bed granulation. In fluid bed granulation, the product is kept fluidized while the solvent or solution is applied by means of a nozzle above or within the fluidized layer. The process of getting the single particles of the product together has to rely on the random movement of the product and on the fact that the product particles are wet enough to adhere to each other. The fact that various parts of the product absorb the solvents at a different rate and get tacky at different levels of product humidity, prevents certain formulations, to be granulated in a fluid bed. An advantage with fluid bed granulation is that the particle distribution can be more narrow than in mechanical granulation and the process is easy to scale up. Critical parameters for fluid bed granulation are the product layer thickness and the distribution of the solution spray over the product.

A disadvantage with fluid bed granulation can be that the granules are not so compact and stable as the granule produced in the mechanical process. Another disadvantage is, that when treating products having a critical wetting rate, the process is difficult to control. During the granulation process the particle size is changing, which means that the volume flow has to be increased at the same rate as the particle size growth to ensure the same grade of suspension of the product layer throughout the process. Because the granule produced in fluid bed granulation is not as stable as in the mechanical granulation process, the granule is vulnerable to attrition during the drying process. Examples of fluid bed granulation are described in U.S. Pat. No. 5,695,701 (Niro).

Several equipments have been designed to employ a combination of mechanical granulation with fluid bed granulation. The fundamental feature of this hybrid granulation process is to add force when the primary particles are brought into contact. The advantage with this granulation is, that the amount of solvent, added to the product, is less than in a pure fluid bed granulation for which reason the drying time of the granules is shorter. However, the control of this hybrid granulation is complicated. A problem with this granulation process is also the difficulty to scale up the batch size, which is rather limited, as in the mechanical granulation process.

Granulation is also performed as an integrated part of a spray drying process in which fine particles produced by spray drying are recycled to the spraying zone in the spray drying apparatus for contacting droplets and wet particles and subsequent drying. However, said method involves a risk of heat-damaging and is, moreover, only suitable when at least a substantial part of the starting material is present as a liquid. Besides, plant investments are high and only acceptable when a spray drying process is necessitated to transform a starting liquid into dry solid. Thus. such processes are out of .consideration when the problem is to granulate a material already present as particles Although the process of the present invention does not involve treatment of particulates while these are in a fluidized bed, the above described fluidized bed granulation processes may be regarded as the closest prior art relative to the present invention.

Various equipment has been used or suggested for fluidized bed granulation. Thus, in published German Patent Application DE 3323418 A1 an apparatus is disclosed for fluidized bed processes primarily for coating of bodies such as tablets, however, also granulation is mentioned as a hypothetical possibility.

A feature of this fluidized bed apparatus is a vertical pipe arranged over an upwardly directed nozzle for spraying liquid droplets onto particles moving upward through said pipe.

From the top of the pipe the thus wetted particles reach the fluidized layer from the bottom of which the particles are again blown up through the pipe until the desired humidity has been achieved.

It is an essential feature of that process as well as of all other prior art fluidized bed granulation processes that although that part of the process in which the particles are wetted may be performed while a certain simultaneous drying takes place, the wetting takes place as a first step followed by a drying step. This means that the liquid sprayed onto the surface of the particles is present on/in the particles for a relatively long time, e.g. for more than 30 min, which leaves ample time for the liquid to penetrate into the interior of the particles. The liquid thus penetrated into the particles is obviously not at disposal on the particle surface for creating the stickiness essential for mutual adhesion between the particles which means that the total amount of liquid to be sprayed and evaporated increases.

This increased consumption of liquid not only impairs the heat-economy of the process but also causes operational problems.

Thus, especially when crystalline materials are granulated, the moisture content in the particles may suddenly exceed a value by which the particles are partly transformed into droplets causing a total caking of the whole batch being treated.

Also the high moisture content of the particles causes problems if a temporary interruption of the process is necessitated. If the flow of fluidizing gas is interrupted, the wet particles immediately collect as a mass on the bottom of the equipment. This mass can no longer be fluidized and must be removed by mechanical means or manually.

The fact that the wetting and the drying are performed to a substantial extent independent of each other involves the drawback that the result of the process cannot be evaluated until the total process is finalized. As explained above, the process cannot be stopped in a critical phase since the result thereof can be destructive and necessitate discharging of the whole batch.

Apart from these shortcomings of the fluidized bed granulation processes, the granulation results are not always satisfactory. often such processes deliver products having a too high proportion of non-agglomerated particles, even if the agglomeration process has been carried on to achieve a desired mean size of the granules.

SUMMARY OF THE INVENTION

It has now turned out that the above drawbacks related to the relevant prior art can be avoided or mitigated by a new process which inter alia involves that the particles to be granulated are subjected to collision promoting conditions and drying extremely short after having been wetted by spraying.

The process of the invention may be performed using equipment of a design similar to or even identical to equipment described for a completely different purpose, viz. coating of particles while avoiding any substantial granulation or agglomeration. Said equipment is described inter alia in U.S. Pat. No. 5,718,764 and termed PRECISION COATER™ (Aeromatic-Fielder). Said U.S. patent is incorporated herein by reference. Details on this equipment will appear from the description below with reference to the drawings.

The invention deals with a process for granulation of a particulate material by subjecting the particles to a repeated circulating movement comprising an upward pneumatical movement from a starting area inside a vertical granulation pipe while the particles are entrained in a stream of drying and moving gas and simultaneously being subjected to a spray of droplets of granulation liquid, said circulating movement further comprising a downward movement outside said pipe, and a horizontal movement towards the starting area for said pneumatical movement, which process is characterized in passing the particles at said starting area into a zone above an annular horizontal aperture of a diameter less than the diameter of said vertical pipe, from which aperture a swirling flow of drying and carrying gas is emitted at a momentum accelerating and controlling the flow of particles in a rotation-symmet-rical, hollow zone above the annular aperture and around an imaginary vertical centre line of said aperture; and from a location on said imaginary centre line producing an upward spray of droplets of granulation liquid hitting the particles while these are in said zone thereby creating efficient contact between wet sticky particles combined with a fast drying to produce stable granules leaving the top of the granulation pipe in a non sticky condition.

It is essential features of this process that the active spray zone is small, only a few percent of the total amount of the batch is in the spray zone at any given time. When the particles pass into said zone above the annular aperture where drying and carrying gas is introduced, the product gets accelerated to ensure sufficient suspension so the individual particle can be wetted evenly. When the product leaves the exit at the top of the duct above the nozzle it has been wetted, particles have been sticked together to form granules, and these have been dried to a substantial extent.

By repeated passages through said pipe, further particles, viz. elementary particles and minor granules, stick to the already formed granules to increase their size as desired. Each granule may typically be subjected to from 20 to 1,000 passages through the pipe.

By the process of the invention it is possible to produce granulates which to the best knowledge of the inventor are not immediately obtainable by prior art granulation processes.

Therefore, the invention also deals with a granulate being the direct product of the process and characterized in having a content of non-granulated particles less than 5% by weight.

Fine lactose particles having a particle size below 38 $\mu$m cannot be granulated satisfactorily by the prior art granulation methods discussed above, for which reason it is a further object of the invention to provide a lactose granulate having a mean granulate size above 200 $\mu$m, consisting essentially of primary lactose particles having a particle size below 38 $\mu$m.

Also fine particles of other crystalline materials are generally regarded as difficult to granulate, for which reason a further object of the invention is to provide a granulate of crystalline particles of high. solubility having a mean granulate size above 200 $\mu$m and being essentially formed of crystalline primary particles of a mean particle size below 25 $\mu$m.

The invention is elucidated further in the follow ing with reference to the drawings.

DETAILED DESCRIPTION OF THE INVENTION

Figure 1:
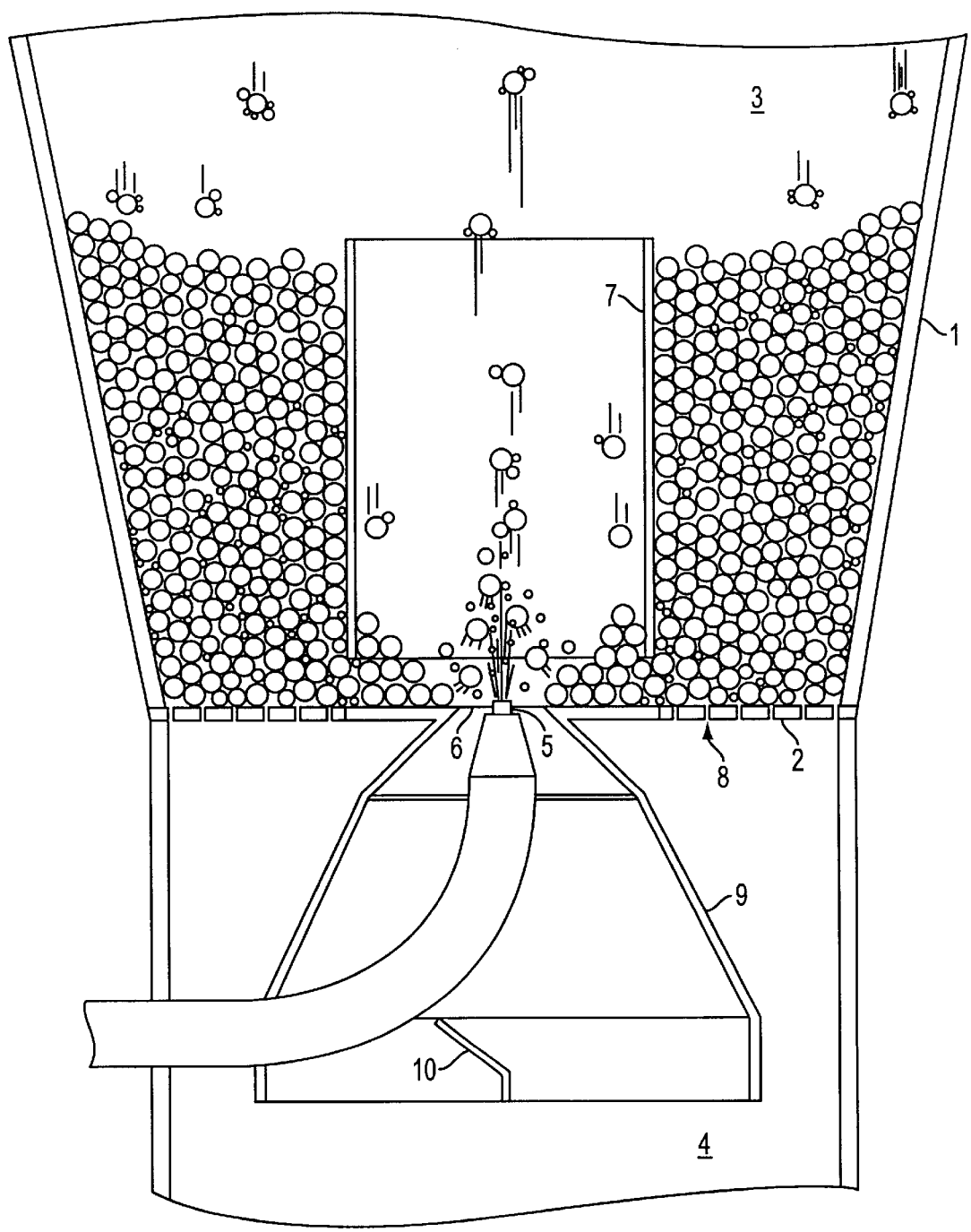
FIG. 1 is a diagrammatical, vertical section through a portion of an embodiment of an apparatus in which the process of the invention is carried out.
Figure 2:
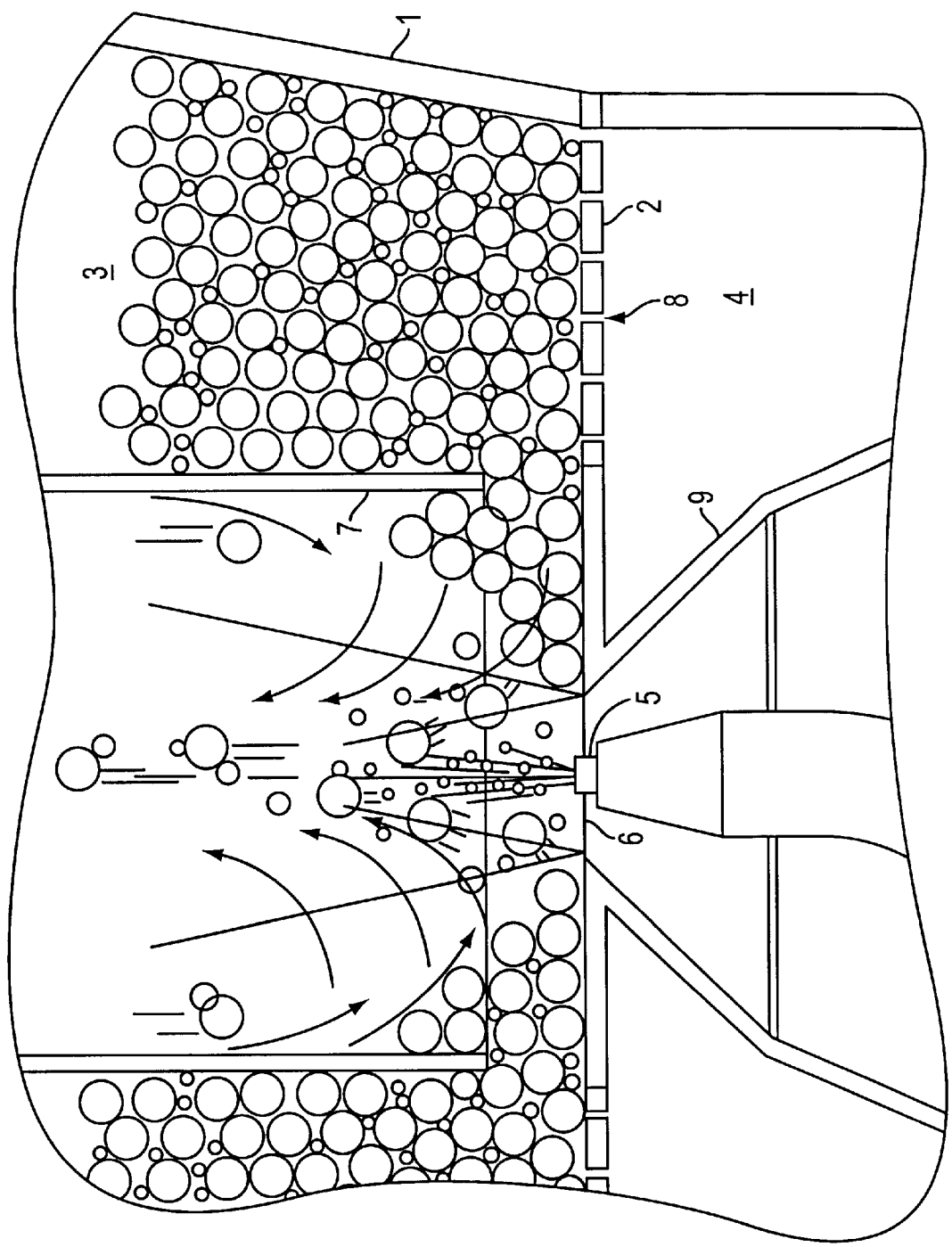
FIG. 2 is a diagrammatically enlarged representation of the central portion of FIG. 1.

Referring now to FIGS. 1 and 2, a granulation apparatus is depicted having a housing 1 in which a base plate 2 is fixed. The base plate divides the apparatus. into an upper granulation chamber 3 and a plenum 4. In the centre of the base plate an upward directed nozzle 5 is arranged. In the depicted embodiment the nozzle in a two-fluid nozzle, but also a pressure nozzle may be used. The nozzle is placed in a circular hole in the base plate of substantially larger diameter than the outer diameter of the nozzle, whereby an annular aperture 6 is formed around the nozzle. The dimensions of said annular aperture 6 may be altered by using different inserts in the base plate (not shown).

Above the base plate 2 in the granulation chamber 3 a pipe 7 is positioned at a certain distance from the base plate.

In the portion of the base plate 2, extending somewhat outside the area below the pipe 7, perforations 8 exist for passing a small amount of air from the plenum 4 to the granulation chamber 3.

Below the base plate, guiding walls 9 are provided. These walls define a rotation-symmetrical space having downward expanding horizontally cross-section area. The gas guiding walls may typically be shaped as a downward expanding conus, but other shapes may be preferred, provided they are rotation-symmetrical and have a downward expanding cross-section area.

Figure 3:
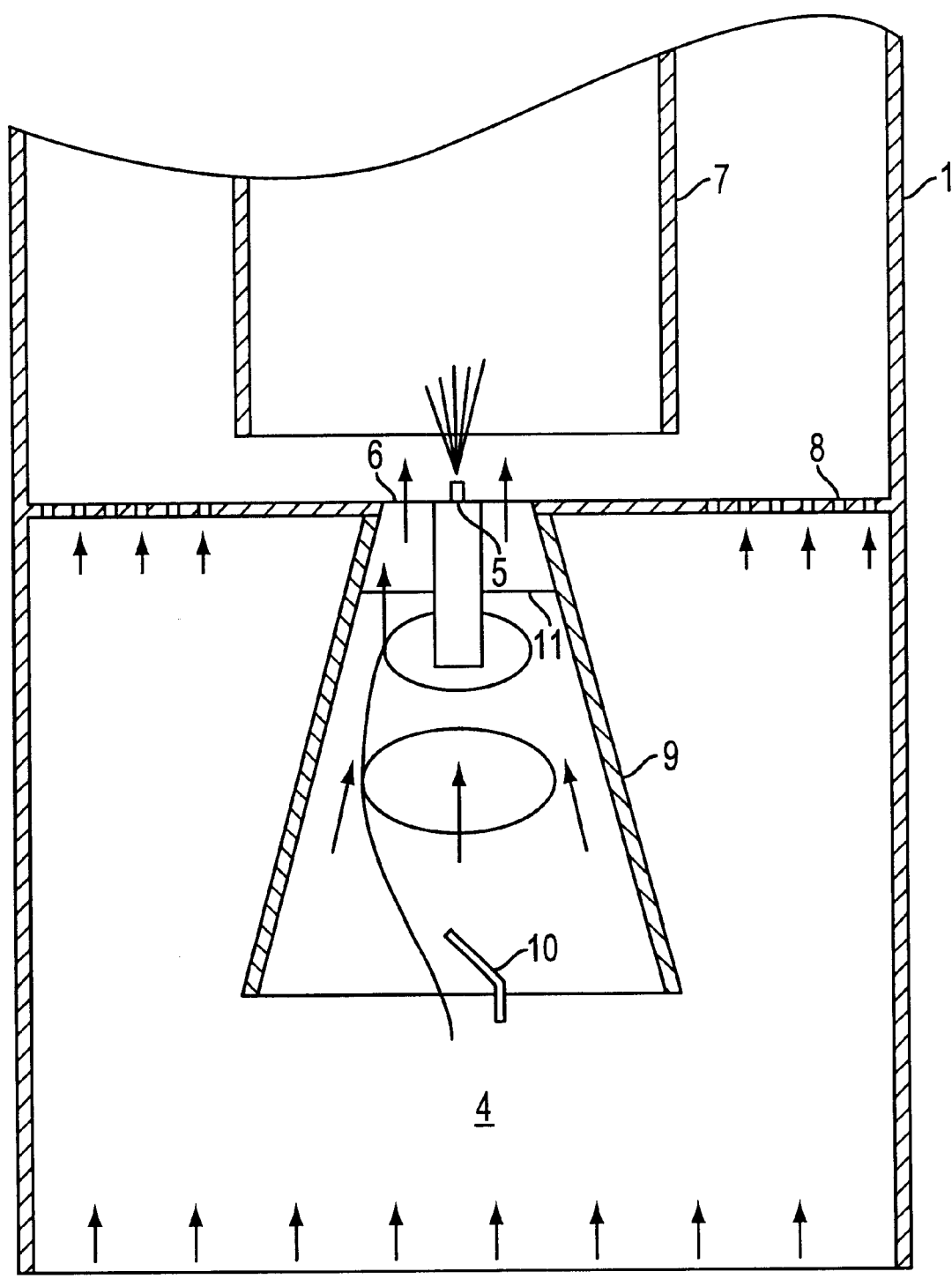
FIG. 3 is a diagrammatical section of a portion of an apparatus essentially similar to the one depicted in FIG. 1 showing especially the means for imparting a swirling movement to the process air.
Figure 4:
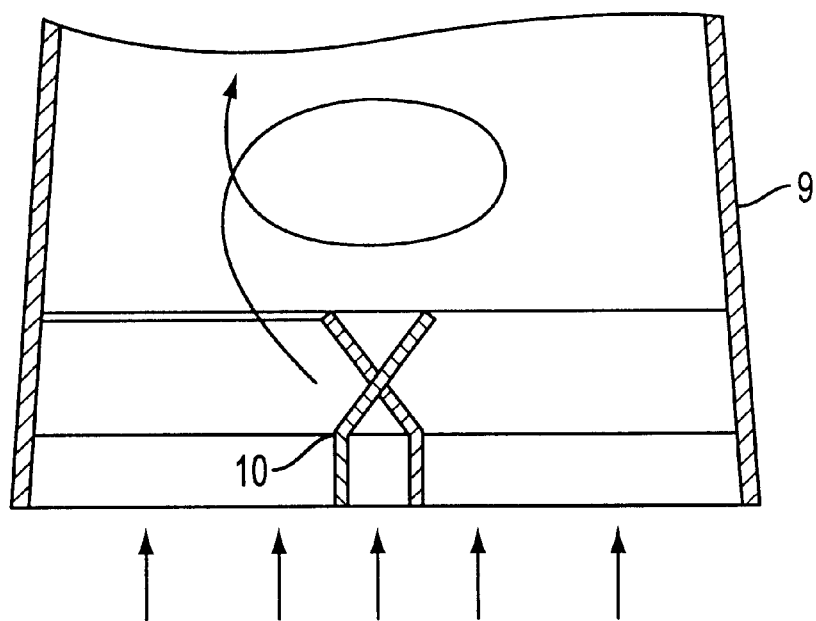
FIG. 4 is a partial vertical section showing the swirl imparting means of the embodiment depicted in FIG. 3 in more details.
Figure 5:
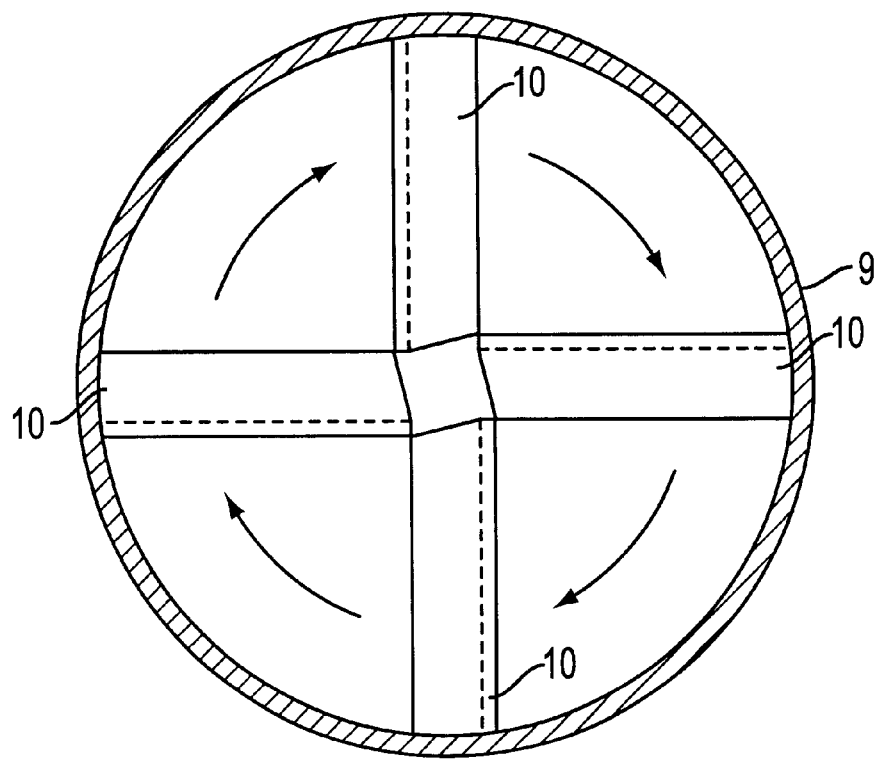
FIG. 5 is a horizontal section showing the same swirl imparting means as seen in FIG. 4.

As indicated in FIG .1 and shown more clearly in FIGS. 3, 4, and 5, means 10 for imparting a swirling flow of an upward gas stream through the guiding walls 9 are provided at the lower portion of said guiding walls.

Between the gas guiding walls 9 below the base plate 2, at a position between the annular aperture 6, but spaced therefrom, and from the means 10, a horizontal net 11 (FIG. 3) is inserted. The function of said net is to catch particles falling down through the aperture 6 when the function of the apparatus is interrupted.

In the top portion of the granulation chamber 3, means (not shown), such as filter means, exist for preventing particles from being entrained by gas leaving the chamber having served as drying and carrying gas. The term "gas" in the present specification and claims comprises atmospheric air.

In FIGS. 2, 3, or 4, it is illustrated how the means 10 for imparting the swirling flow to the gas stream passing from plenum 4 to the chamber 3 may be constructed. In the depicted version, said means are for simplicity formed by only four elements, each having a vertical and a slanted section deflecting the air flow in the same direction. However, typically a greater number of elements will be used for said purpose.

At the operation of the apparatus, a pressure difference is created between the plenum 4 and the granulation chamber 3, whereby an upward gas stream passes between the guiding walls 9 and through the aperture 6. When this gas passes the means 10, e.g. embodied as depicted in FIGS. 3, 4, and 5, it obtains a swirling flow pattern. During the upward passage between the walls 9, the available space decreases and, consequently, an acceleration takes place involving not only an increase of the velocity in upward direction but also an increase of the rotational velocity. This acceleration has the beneficial effect of decreasing or removing the turbulence which is unavoidably created by the rotation-imparting means 10.

Although the swirling pattern of the flow passing through the annular aperture 6 is important it must not necessarily be created by the depicted means which are only to be regarded as examples of constructions able to provide the necessary swirling motion of the gas flow.

When performing the process of the invention, the particulate material to be granulated is introduced into the chamber 3, in which it collects in the bottom portion mainly in a zone outside the pipe 9 called the down-flow zone. From the plenum 4 gas flows through the several small perforations 8 below the down-flow zone, whereby the material to be granulated is kept in an aerated but not fluidized state. The lifting effect of the not very intensive gas stream serves only to prevent packing in the down-flow zone of the material to be granulated and to increase free-flowing thereof. However, as explained below, the material in this zone is not so moist that there is any need for a fluidization to avoid that the particles stick together or to the walls.

The main portion of the gas from the plenum 4 flows through the space between the guiding walls 9 where the gas achieves a swirling flow as explained above.

When the particles flow beneath the pipe 7, they reach what above is termed "starting area" which in FIGS. 1 and 2 is above the non-perforated portion 12 of the base plate 2.

From there the particles pass into a zone above the annular horizontal aperture 6.

The swirling gas flow determines the flow pattern of the particles in a rotation-symmetrical, hollow zone above the annular aperture and around an imaginary vertical centre line of said aperture. From the nozzle 5 an upward spray of granulation liquid hits the particles while these are in said zone, thereby making them sticky before and simultaneously with the mutual collision of the particles.

Relative to the drying gas velocities used in comparable particle drying in granulation operations, the swirling gas flow through the annular aperture 6 is very fast.

Therefore, the drying of the particles wetted by the droplets of granulation liquid is extremely fast and, consequently, it is possible to conduct the process using such efficient drying that the clusters or agglomerates of two or more particles formed by contact between the particles in wet condition are dried to the moisture content desired in the final product, before said clusters or. agglomerates reach the top of the pipe 7.

Although, for many products, including press powders for tablets where a moisture of 2–4% is suitable, it is preferred to dry the agglomerates to the moisture content desired in the final product at each passage through the pipe 7, it is not always necessary to dry the particles so efficiently in each passage. A certain increase of the moisture content in the particles can be allowed as long as the granules leaving the pipe are no longer sticky and can move downwards through the down-flow zone for repeated passage through the pipe 7. In such cases process is terminated by a drying, typically a few minutes, by continuing the process without spraying.

It is, however, important that a substantial and very fast drying takes place in the zone above the annular pipe to prevent that the central portions of the particles are over-moistured by granulation liquid.

It is to be observed that only a very small proportion of the total amount of particulate material in a batch is actually under treatment at each moment. This is one of the reasons why operational changes, including shut-down of the process, are less complicated than in other processes, such as fluidized bed processes where a larger proportion or even all particles are simultaneously provided with the amount of moisture necessary for their granulation, followed by a lengthy drying period.

Depending on the material to be granulated and the desired granulation result, the process can be continued until the particles have passed through the pipe 7 a suitable number of times, e.g. between 20 and 1,000 times at average. Each passage through the pipe 7 can be regarded as a complete granulation process comprising wetting,. collision with mutual adherence, and drying. This, in principle complete granulation, is then repeated until the desired granule size and dust removal are obtained.

In this respect, the process of the invention differs essentially from the prior art as evident from the description above.

The velocity of the swirling gas flow emitted from the annular aperture 6 is high, typically 25–100 mr/sec, calculated with regard to the upward direction only. Successful experiments have been performed using gas velocities in the ranges of 24–28, 43–48, 70–76, and 90–96 m/sec. In comparison to prior art processes using a similar pipe 7 but with no swirl of the process gas, said velocities are high. The selection of the proper velocity for said gas flow is determined by the fact that a suitable acceleration and suspension of the particles shall be obtained while the particles on the other hand shall not be scattered too much outside the zone where they are hit by the atomized droplets of granulation fluid.

The swirling movement of the gas flow enables a higher actual velocity of the gas relative to the particles than if the same amount of gas were emitted vertically upwards. Also the particle movement is improved to enable a more efficient wetting by the sprayed droplets. The swirl is necessary to prevent the particles from being sucked too early toward the imaginary centre line, and thus helps to delay the collision of the particles until these have been wetted or are in the process of being wetted.

Use of a swirling gas flow also involves the advantage that the flow pattern above the base plate 2 becomes rotational-symmetrical which is essential for a uniform treatment of the particles and also serves to avoid pulsations in the particle flow through the apparatus, which pulsations otherwise cause operational problems.

When the upward spray of droplets of granulation fluid is produced by means of a two-fluid nozzle, which at the present stage of development of the process represents a preferred embodiment, the atomizing gas conducted to the two-fluid nozzle is preferably at a pressure less than 1.5 bar above atmospheric pressure.

If the atomization gas pressure is too high, the atomizing gas has a scattering effect on the particles impeding their mutual contact meaning that the particle flow becomes more akin to the one desired in a coating process than the one desired for granulation.

Preferably, the two-fluid nozzle is operated with atomizing gas at an over-pressure less than 1 bar, e.g. 0.2–0.5 bar.

An advantage of using a relatively low pressure for the atomizing gas in the two-fluid nozzle is also caused by the fact that thereby the droplet size increases and thus the evaporation from the surfaces of the droplets before the latter reach the particles is decreased.

When a pressure nozzle is used for the atomization of the granulation fluid, the moot suitable pressure is determined by experimentation, typically within the range of 5–10 bar.

As explained above, the process may for most materials be conducted using a drying in the granulation pipe so efficient that at each passage the granules and particles leave the granulation pipe having a moisture content not above the one desired in the final product, meaning that nearly the total amount of material being treated, with exception of only a very small proportion of particles present in the granulation pipe, has a desired moisture content and no extra drying is necessitated.

However, when it is preferred to perform the process in such a way that a certain increase of moisture content takes place during the granulation and an after-drying is used as explained above, said moisture increase is rather limited in compared to the moisture content necessary in fluidized bed processes. The maximum moisture content depends on the materials being granulated and should, preferably, not exceed 12% by weight.

Thus, an embodiment of the process which may be preferred comprises a first step in which the moisture content of the material being treated is increased to not above 12% by weight, followed by a second step in which said moisture content is decreased to the one desired in the final granulated product.

The process of the invention may be performed in an apparatus having more than one granulation pipe in a common housing.

Such apparatuses having several pipes in a common housing may be designed similarly to those described in connection with coating apparatuses in the above cited U.S. Pat. No. 5,718,764.

The material may be granulated batch-wise or in a continuous process in which it passes through several granulation pipes in series.

Said granulation pipes may be joint as units in series where each unit comprises more than one pipe. Relevant information on continuous operation and apparatuses therefore can be found in U.S. Pat. No. 5,648,118 (Niro) and U.S. Pat. No. 5,470,387 (Niro) dealing with coating.

Moreover, the granulation by the process according to the invention can be performed as a step of a combined process in which it is succeeded by a coating or drying or both, preferably in equipment being the same or similar to the one used for the granulation.

It should be observed that in the present specification and in the attached claims the term "granulation fluid" is used as covering any liquid able to provoke adhesion between the particles to be granulated. This adhesion may be caused by a binder dissolved in the liquid or being a result of the liquid acting as a solvent for suitable components of the material to be granulated.

The process of the invention is very advantageous from an operational viewpoint. Only little attendance is required and it is suitable for automatic control, e.g. utilizing signals from sensors measuring humidity in the exit gas from the granulation chamber and in the product, by imaging, etc.

The present process can be applied to substan- tially all materials conventionally subjected to granulation processes. Examples of materials which have hitherto been successfully granulated using the method are as follows. yeast. detergents, soda ash, flocculants, herb extract, gelatin, baby food, pharmaceuticals for tabletizing, sugars, and other crystalline materials.

As explained above, the process enables granulation of materials hitherto regarded as not being suitable for granulation Very detailed investigations have been made in connection with lactose-containing materials for producing pharmaceutical tablets. These investigations have substantiated that materials granulated by the present process in several respects relevant in tablet manufacture are superior to conventionally granulated material.

To further explain the invention and the results obtainable thereby, the following non-limiting examples are presented.

EXAMPLES

Examples 1

In this example, the process of the invention was performed in a coating apparatus in principle corresponding to the one depicted in the drawings.

The diameter of the base plate 2 was 270 mm. The diameter of the granulation pipe 7 was 150 mm and the outer diameter of the annular aperture 6 was 60 mm. The pressure of the atomizing air led to the two-fluid nozzle was 0.25 bar over-pressure.

The volume flow rate of process air introduced through the annular aperture 6 was 250 m$^3$/h and the temperature of said air was 80° C. This corresponds to an upward velocity of the gas through the annular aperture of appr. 25 m/sec.

Through the two-fluid nozzle water was sprayed at a rate of 110 g/min. The particulate material which was granulated was a normal pharmaceutical base formulation for tablet pressing without any drug added to the base. The composition was as follows:

| Material | [%{total}] | Actual weight [g] |
| --- | --- | --- |
| Lactose 200 # | 88 | 4400 |
| Plasdone XL 10 | 2 | 100 |
| Microcrystalline Cellulose | 5 | 250 |
| Kollidon 30 (PVP) | 5 | 250 |
| Total | 100 | 5000 |

Lactose 200# in a product passing a 200 mesh screen (75 μm).

Batch size 5 kg, corresponding to the height of e product layer in the apparatus being 45 cm.

The granulation process was continued for 1,423 sec. at which time 2.55 kg water had been applied.

The process was then terminated and the product analyzed. The following results were obtained:

Granulate size: weight mean particle size 514.0 μm, 75% fractile: 870 μm, 25% fractile: 300 μm, fine particles (d<75 μm): 0.69% by weight.

Product humidity: 7.4% (LOD)

This example shows that by the process of the invention it is possible to obtain a superior granulation result with a remarkably low content of fine particles and at the same time avoiding any moisturing of the total amount of material exceeding 7.4%.

Example 2

The process was performed with the same equipment and the same process parameters as in Example 1, the only difference being a shortening of the process time to 1,380 sec.

The results were rather similar to those obtained in Example 1:

Weight mean particle size: 483.3 μm, 75% fractile: 890 μm, 25% fractile: 260 μm, fine particles: 1.75% by weight.

Product humidity: 5.4% LOD.

This example shows that it is possible to operate the process at even lower humidity than in Example 1 and still obtain a satisfactory agglomeration and a very low amount of fine particles.

Example 3

Also in this example the same apparatus and the same process parameters as in Example 1 was used apart from the fact that 2.53 kg water was sprayed during a period of 1,392 sec and after that period the spraying was stopped but the drying continued in 3 min.

The results were as follows:

Weight mean particle size: 495.9 μm, 75% fractile: 730 μm, 25% fractile: 270 μm, fine particles (d<75 μm); 6.23% by weight.

Product humidity: 2.8% LOD.

Also these results are very satisfactory. Apparently, a small increase of the contents of fines has occurred during the final drying. However, the amount of fines does not exceed what is regarded as optimal in mixtures for tabletizing in the pharmaceutical industry.

Example 4

In this example the material to be granulated was formulated as indicated in Example 1 apart from the fact that the lactose was of much finer particle size, viz. 450 mesh corresponding to a particle size lees than 38 μm. Such fine lactose is very difficult to granulate, especially in fluid bed apparatuses since the fine particles are blown away at gas velocities as low as 0.05 m/sec.

The apparatus and the batch size and atomizing pressure were as in Example 1.

The agglomeration liquid was water applied in an amount of 3.00 kg.

The spraying was continued for 1,515 sec followed by a drying period of 5 min and 15 sec.

The result was as follows:

Weight mean particle size: 418.9 μm, 75% fractile: 700 μm, 25% fractile: 200 μm, fine particles: 15.9% by weight.

Product humidity: 3.0% LOD.

In view of the fact that this very fine lactose powder is known as extremely difficult to granulate in airborne condition, the results are satisfactory and the amount of fine particles does not exceed the maximum value usually accepted for tablet pressing.

Example 5

In this example powdered sugar (saccharose) was granulated. This material is regarded as extremely difficult to granulate in fluidized bed processes, but using conditions similar to those described in the above examples a product having a weight mean particle size of 419 µm with a mean particle ratio of 3.5 was obtained.

Example 6

This example comprises four experiments using solutions of polyvinylpyrrolidone (PVP) at different concentrations as granulation liquid.

The basic material was a chemical composition having the particle size distribution shown in the below table.

The aim of this experiment was to produce a granulate having a main fraction of 600 µm. It was also desired to remove dust which here means particles below 250µ.

The experiments were performed in a granulator corresponding to the one depicted in the drawings having a diameter of the base plate of 180 mm. The batch in each experiment was 1 kg.

The first experiment was with a granulation liquid being a 20% w/w aqueous PVP solution.

The ambient condition was 22° C. with a specific humidity of 7.6 g $H_2O$/kg air, which is equal to a relative humidity RH of 45%.

The gas inlet temperature was 110° C. The gas rate was 200 $m^3$/h corresponding to an upward velocity of the swirling gas leaving the annular aperture of 80 m/sec, The spray rate of the PVP solution was 20 g/min, with an atomizing pressure of 0.75 bar. The outlet gas temperature at this spray rate was 45° C. and the product temperature 52° C. This corresponds to an outlet humidity of 37% RH. The spraying time was 4 min.

In experiment 2, the 20% PVP solution was substituted by a 5 w/w % PVP solution and the spraying time was 2 min and 25 sec.

In the 3rd experiment, the granulation liquid was a 10% PVP solution and the spraying time was 4 min and 20 sec.

In the 4th experiment, the granulation liquid was a 15% PVP solution and the spraying time was 7 min.

The beat results were obtained in the 4th experiment using a 15% PVP solution as granulation liquid. In this experiment the main fraction, 600 µm, amounted to 52.8% by weight and only 8.7% by weight was below the 45 µm fraction. In this experiment only 0.2% by weight consisted of lumps or belonged to the fraction above 1,400 µm.

The grain sizes of the starting material and of the product of each of these 4 experiments are shown in the following table, The above agglomerates were obtained with a residual humidity of typically 4% by weight making any further drying superfluous.

Example 7

In this example a sweetening agent, inolin, was granulated using an aqueous 6 w/w % sweetener solution as granulation liquid.

The desired granulates were obtained with a moisture content of 2.5% without final drying, satisfying the requirement of a maximum moisture content of 3% valid for this type of product.

Example 8

Tests have also been performed with sodium carbonate. It turned out that a satisfactory free-flowing non-dusting product could be obtained using a 30 w/w % aqueous solution as granulation liquid.

| Grain size [µm] | Initial [%{total}] | Exp #1 20 [%{PVP}] | Exp #2 5 [%{PVP}] | Exp #3 10 [%{PVP}] | Exp #4 15 [%{PVP}] |
|---|---|---|---|---|---|
| 1400 | 0 | 10.8 | 0.2 | 0.7 | 0.2 |
| 850 | 0 | 12.3 | 13.3 | 15 | 15.7 |
| 600 | 14.5 | 23.3 | 32 | 42.9 | 53.8 |
| 425 | 23.9 | 22.6 | 24.9 | 23.3 | 22.5 |
| 250 | 36.2 | 22.9 | 22.3 | 15 | 8.2 |
| 100 | 20.8 | 7.3 | 6.6 | 2.6 | 0.5 |
| 10 | 5.6 | 0.7 | 0.7 | 0.5 | 0 |

What is claimed is:

1. A process for granulation of a particulate material by subjecting the particles to a repeated circulating movement comprising an upward pneumatical movement from a starting area inside a vertical granulation pipe while the particles are entrained in a stream of drying and moving gas and simultaneously being subjected to a spray of droplets of granulation liquid, said circulating movement further comprising a downward movement outside said pipe, and a horizontal movement towards the starting area for said pneumatical movement, characterized in passing the particles at said starting area into a zone above an annular horizontal aperture of a diameter less than the diameter of said vertical pipe, from which aperture a swirling flow of drying and carrying gas is emitted at a momentum accelerating and controlling the flow of particles in a rotation-symmetrical, hollow zone above the annular aperture and around an imaginary vertical centre line of said aperture; and from a location on said imaginary centre line producing an upward spray of droplets of granulation liquid hitting the particles while these are in said zone thereby creating efficient contact between wet sticky particles combined with a fast drying to produce stable granules leaving the top of the granulation pipe in a non sticky condition.

2. The process of claim 1, characterized in that the swirling as flow is emitted at a velocity of 25–100 m/sec, calculated with regard to the upward direction only.

3. The process of claim 1 characterized in that the upward spray or droplets of granulation liquid is produced by means of a two-fluid nozzle.

4. The process of claim 3 chararcterized in that atomizing gas at an over-pressure less than 1.5 bar is used.

5. The process of claim 3, characterized in that atomizing Was at an over-pressure less than 1 bar is used.

6. The process of claim 3, characterized in that atomizing gas an over-pressure of 0.2–0.5 is used.

7. The process of claim 1, characterized in that, calculated on the total amount of particulate materials being treated, at no time the moisture content exceeds 12% by weight.

8. The process of claim 1, characterized in that the process comprises a first step in which the moisture content of the material being treated is increased to not above 12% by weight, followed by a second step in which said moisture content is decreased to the one desired in the final granulated product.

9. The process of claim 1, characterized in that the upward spray of droplets of granulation liquid is produced by means of a pressure nozzle.

10. The process of claim 1, characterized in that the swirling flow of gas emitted from the annular aperture is provided by means of guiding walls below said aperture and fitting to the edge thereof which guiding walls define a rotation-symmetrical space having downward expanding horizontal cross-section area, said gas guiding walls being placed in or debouch in a plenum connected to a source of gas at a higher pressure than the pressure existing above the annular aperture, and said gas guiding walls carrying at distance from said annular aperture, at a location where said horizontal cross-section area is substantially larger than the area of the annular aperture, means for imparting a swirling movement to an accelerating flow of gas stream upward between the guiding walls and through the annular aperture.

11. The process of claim 1, characterized in treating the material in an apparatus having more than one granulation pipe in a common housing.

12. The process of claim 1, characterized in that the material is granulated in a continuous process in which it passes through several granulation pipes in series.

13. The process of claim 12, characterized in that said granulation pipes are arranged as units in series, each unit comprising more than one pipe.

14. The process of claim 1, characterized in that the granulation is performed as a step of a combined process in which it is followed by a coating or drying or both, in equipment being the same or similar to the one used for the granulation.

15. A granulate being the direct product of the process of claim 1, characterized in having a content of non-granulated particles less than 5% by weight.

16. Lactose granulate produced according to the process of claim 1 having a mean granulate size above 200 $\mu$m, consisting essentially of primary lactose particles having a particle size below 38 $\mu$m.

17. Granulate of crystalline particles of high solubility produced according to the process of claim 1 having a mean granulate size above 200 $\mu$m and essentially formed of crystalline primary particles of a mean particle size below 25 $\mu$m.

* * * * *